United States Patent
Golfieri et al.

(10) Patent No.: US 10,293,972 B2
(45) Date of Patent: May 21, 2019

(54) OPENING DEVICE AND APPARATUS FOR MOULDING AN OPENING DEVICE ON A SHEET PACKAGING MATERIAL

(71) Applicant: TETRA LAVAL HOLDINGS & FINANCE S.A., Pully (CH)

(72) Inventors: Daniele Golfieri, Castelfranco Emilia (IT); Franco Cani, Asti (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 152 days.

(21) Appl. No.: 15/317,013

(22) PCT Filed: May 28, 2015

(86) PCT No.: PCT/EP2015/061781
§ 371 (c)(1),
(2) Date: Dec. 7, 2016

(87) PCT Pub. No.: WO2015/189036
PCT Pub. Date: Dec. 17, 2015

(65) Prior Publication Data
US 2017/0113834 A1    Apr. 27, 2017

(30) Foreign Application Priority Data

Jun. 10, 2014  (EP) .................................. 14171690

(51) Int. Cl.
*B65D 47/10*        (2006.01)
*B65D 5/74*         (2006.01)
(Continued)

(52) U.S. Cl.
CPC ........ *B65D 5/747* (2013.01); *B29C 45/14344* (2013.01); *B65D 17/507* (2013.01);
(Continued)

(58) Field of Classification Search
CPC ...... B65D 5/747; B65D 5/749; B65D 47/103; B65D 2251/0093; B65D 17/507; B29C 45/14344
(Continued)

(56) References Cited

U.S. PATENT DOCUMENTS 3,458,080 A  *  7/1969  Laurizio .............. B65D 39/084
                                                  220/258.2
3,494,500 A  *  2/1970  Foster .................. B65D 17/506
                                                  220/269

(Continued)

FOREIGN PATENT DOCUMENTS

CN      101687352 A     3/2010
EP      0 392 078 A2    10/1990
(Continued)

OTHER PUBLICATIONS

Office Action (Notification of Reasons for Refusal) dated Jul. 9, 2018, by the Japanese Patent Office in corresponding Japanese Patent Application No. 2016-572415 and an English Translation of the Office Action. (6 pages).
(Continued)

*Primary Examiner* — Charles Cheyney
(74) *Attorney, Agent, or Firm* — Buchanan Ingersoll & Rooney PC

(57) ABSTRACT

An opening device for a package made of a sheet packaging material—said sheet packaging material comprising at least a first layer and a second layer, and having a hole formed through said first layer and sealed by a cover portion of said second layer—is made of plastic material molded onto said cover portion, and in turn comprises a spout defining a pouring opening and a wall portion closing said pouring opening, said wall portion defining, together with said cover portion, a user-removable sealing portion of said spout, a weakening region being interposed between said wall por-
(Continued)

tion and said spout and said cover portion covering said weakening region; a molding apparatus for molding an opening device on a sheet packaging material is also disclosed.

19 Claims, 7 Drawing Sheets

(51) Int. Cl.
*B29C 45/14* (2006.01)
*B65D 17/50* (2006.01)
*B29L 31/00* (2006.01)
*B29K 105/20* (2006.01)
*B29K 623/00* (2006.01)
*B29K 711/12* (2006.01)

(52) U.S. Cl.
CPC ...... *B29C 45/1459* (2013.01); *B29K 2105/20* (2013.01); *B29K 2623/06* (2013.01); *B29K 2623/12* (2013.01); *B29K 2711/12* (2013.01); *B29L 2031/712* (2013.01); *B29L 2031/7166* (2013.01)

(58) Field of Classification Search
USPC .......... 222/541.9, 530, 566, 529, 541.2, 83, 222/153.07, 541.1, 153.06; 220/270, 276, 220/269, 258.2, 258.5
See application file for complete search history.

(56) References Cited

U.S. PATENT DOCUMENTS

| | | | | |
|---|---|---|---|---|
| 4,442,949 A | * | 4/1984 | Dwinell | B65D 47/063 220/257.2 |
| 4,724,979 A | * | 2/1988 | Cleevely | B65D 47/103 220/258.2 |
| 5,054,642 A | * | 10/1991 | Yoshida | B29C 45/1418 220/269 |
| 5,147,591 A | | 9/1992 | Yoshida | |
| 5,769,277 A | * | 6/1998 | Elliott | B65D 47/103 215/254 |
| 5,839,627 A | * | 11/1998 | Hicks | B65D 5/701 222/541.9 |
| 7,878,352 B2 | * | 2/2011 | von Spreckelsen | B65D 51/20 215/232 |
| 8,113,374 B2 | * | 2/2012 | Steiger | B65D 51/228 220/258.2 |
| 2010/0166923 A1 | * | 7/2010 | Martini | B29C 45/14344 426/115 |
| 2012/0228339 A1 | * | 9/2012 | Kaneko | B65B 9/20 222/566 |
| 2012/0273996 A1 | | 11/2012 | Martini et al. | |
| 2013/0273214 A1 | | 10/2013 | Martini et al. | |

FOREIGN PATENT DOCUMENTS

| | | |
|---|---|---|
| EP | 2 008 787 A1 | 12/2008 |
| EP | 2 361 743 A1 | 8/2011 |
| JP | H02-303821 A | 12/1990 |
| JP | 08-085563 A | 4/1996 |
| JP | 8-91410 A | 4/1996 |
| JP | 2001-240104 A | 9/2001 |
| JP | 2009-126552 A | 6/2009 |
| JP | 2011-230798 A | 11/2011 |
| JP | 2012-025410 A | 2/2012 |
| JP | 2013-056688 A | 3/2013 |
| JP | 2013-520330 A | 6/2013 |
| WO | 2011/065556 A1 | 6/2011 |
| WO | 2011/104287 A1 | 9/2011 |

OTHER PUBLICATIONS

International Search Report (PCT/ISA/210) dated Aug. 18, 2015, by the European Patent Office as the International Searching Authority for International Application No. PCT/EP2015/061781.
Office Action issued by the Chinese Patent Office dated Feb. 26, 2019 in corresponding Chinese Patent Application No. 201580022724.9, and English language translation of the Office Action (11 pages).

* cited by examiner

OPENING DEVICE AND APPARATUS FOR MOULDING AN OPENING DEVICE ON A SHEET PACKAGING MATERIAL

TECHNICAL FIELD

The present invention relates to an opening device, in particular an opening device obtained by molding plastic material on a sheet packaging material. The invention further relates to an apparatus for molding an opening device on a sheet packaging material.

BACKGROUND OF INVENTION

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of lamination layers of heat-seal plastic material, e.g. polyethylene films, covering both sides of the base layer.

In the case of aseptic packages for long-storage products, such as UHT milk, the packaging material also comprises a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized in the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

To open the packages described above, various solutions have been proposed, including reclosable opening devices made of plastic material and substantially comprising a spout defining a through opening and fitted to a hole in a wall of the package, and a removable, e.g. screw or hinged, cap fitted to and outwardly closing the spout.

EP-A-2008787, discloses a method and apparatus for injection molding an opening device directly on a prelaminated hole, i.e. a hole formed in the base layer only and covered by the other lamination layers, including the layer of gas-barrier material, of the packaging material.

In practice, the molten plastic material is injected onto one side of the prelaminated hole to cover it up to an annular peripheral portion thereof and to form, in this way, a plastic material confetti portion directly attached to the prelaminated hole; the molten plastic material is then forced to pierce the prelaminated hole at such annular peripheral portion to form a pouring spout of the opening device projecting from an opposite side of the prelaminated hole and attached to the confetti portion through a smaller-section annular membrane connection portion adapted to be torn by the user to open the package.

In this way, the material forming the prelaminated hole is first pierced through and then resealed by the plastic material forming the spout. Therefore, the resulting package has gas-barrier properties.

DISCLOSURE OF INVENTION

One object of the present invention is to improve the gas-barrier properties of the known opening devices.

According to a first aspect of the invention, there is provided an opening device as claimed in claim 1.

According to a second aspect of the invention, there is provided an apparatus for molding an opening device on a sheet packaging material as claimed in claim 8.

BRIEF DESCRIPTION OF THE DRAWINGS

Some preferred, non-limiting embodiments of the present invention will be described by way of example with reference to the accompanying drawings, in which.

DETAILED DESCRIPTION OF PREFERRED EMBODIMENTS

Figure 1:
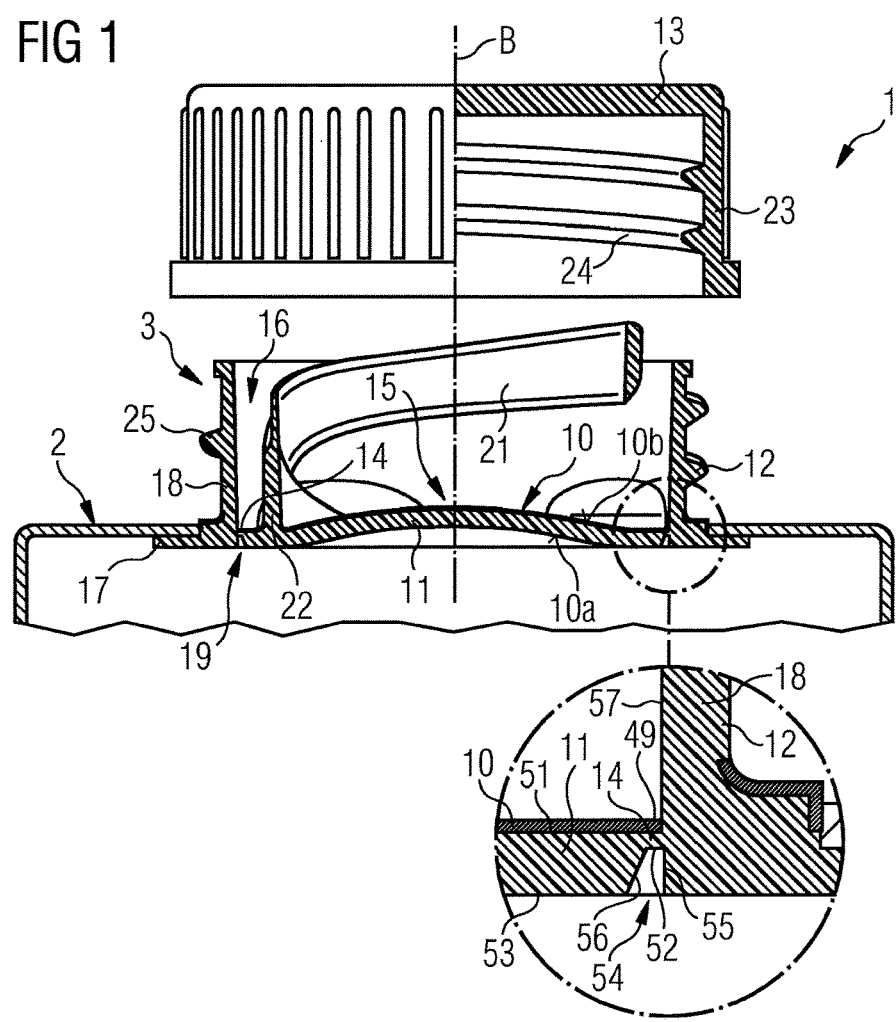
FIG. 1 shows a partly sectioned side view of a sealed package for pourable food products, made of a sheet packaging material on which an opening device according to a first embodiment of the invention is molded.

Number 1 in FIG. 1 indicates as a whole a sealed package for pourable food products, made of a multilayer sheet packaging material 2 and to which an opening device 3 of plastic material is applied by molding, in particular by injection molding.

In the example shown, package 1 is parallelepiped-shaped and of the type known by the trade name Tetra Brik Aseptic (registered trademark). The opening device according to the present invention, however, may also be applied to other types of packages.

Figure 2:
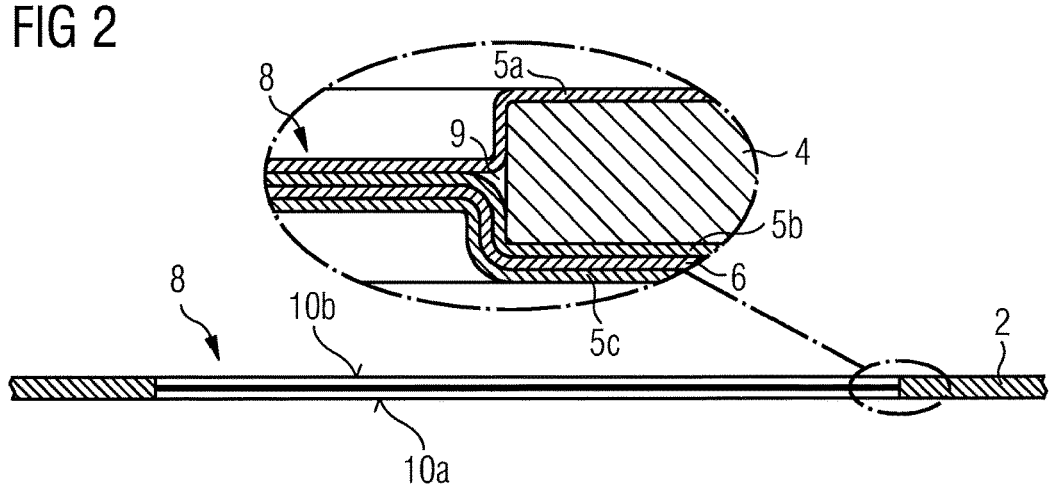
FIG. 2 shows a section of the packaging sheet packaging material of FIG. 1 before the opening device is molded.

With particular reference to FIG. 2, the packaging material 2 comprises a base layer 4 for stiffness and strength, which may be made of fibrous material, e.g. paper, or mineral-filled polypropylene material, and a first covering layer 5a and a second covering layer 5b, made of heat-sealable plastic material, e.g. polyethylene films, and covering both sides of base layer 4.

In the case of an aseptic container for long-storage products, such as UHT milk, the packaging material 3 also comprises a barrier layer 6 made of gas-barrier material, e.g. aluminium foil or ethyl vinyl alcohol (EVOH) film, which is superimposed on the second covering layer 5b and is in turn covered with a third covering layer 5c, made of heat-sealable plastic material, e.g. a polyethylene film, forming the inner face of the container eventually contacting the food product.

In other words, the first covering layer 5a, the second covering layer 5b, the barrier layer 6 and the third covering layer 5c define lamination layers applied to the base layer 4 when producing packaging material 3 in the form of a continuous sheet.

The packaging material 2 also comprises a number of removable portions 8 (only one shown in the drawings) equally spaced in a lengthwise direction A of the packaging material 2, and to which the opening devices 3 are subsequently molded.

In the following part of the description, reference is made to one removable portion 8 and one opening device 3 for the sake of simplicity.

In the example shown, the removable portion 8 is defined by a so-called prelaminated hole, i.e. a hole (or opening) 9 formed through the base layer 4 of the packaging material 2 and covered by the above-mentioned lamination layers, so that the hole 9 is sealed by a respective sheet cover portion 10.

In an alternative embodiment not shown, the cover portion 10 may even be defined by only one or some of the above-mentioned lamination layers. For example, the cover portion 10 may be made solely of gas-barrier material.

In another alternative embodiment not shown, the cover portion 10 may be defined by a patch fixed to the rest of the packaging material 2 to seal a hole formed, in this case, through the full thickness of the packaging material 2.

As shown in particular in FIG. 1, the opening device 3 has an axis B perpendicular to the lengthwise direction A of the packaging material 2, and substantially comprises a wall portion 11 adhering to a first side 10a of the cover portion 10, in the example shown, the side eventually facing inwards of package 1. The opening device 3 further comprises a tubular spout 12, which is fixed to the packaging material 2, about the hole 9, and defines an opening 16 by which to pour the food product from package 1. The spout 12 extends through the cover portion 10 so as to project from both the first side 10a and a second side 10b of the cover portion 10, opposite to the first side 10a. The opening device 3 also comprises a cap 13 (FIG. 1) which fits removably to the spout 12 to close the opening 16.

More specifically, the wall portion 11 and the spout 12 are molded in one piece. A weakening region 14 is interposed between the wall portion 11 and the spout 12. The cap 13 is formed separately from the whole comprising the wall portion 11 and the spout 12.

The wall portion 11 and the cover portion 10 together define a sealing portion 15 sealing the opening 16 of the spout 12.

As shown particularly in FIG. 1, the spout 12 comprises an annular flange portion 17 fixed to the packaging material 2, about the hole 9. The spout 12 further comprises a cylindrical tubular neck portion 18 projecting axially from an inner lateral edge of the flange portion 17, and extending through a peripheral annular portion of the cover portion 10. In other words, the neck portion 18 projects from the packaging material 2 on the second side 10b.

As shown in FIG. 1, the wall portion 11 and the flange portion 17 are joined by the weakening region 14 that is defined by an annular portion 19, which has a thickness smaller than the thickness of the wall portion and the thickness of the flange portion 17. The annular portion 19, i.e. the weakening region 14, may be easily torn to detach the sealing portion 15 from the spout 12, when a user opens the package 1 for the first time.

On the side facing the cap 13, the wall portion 11 has an integral projecting pull ring 21, by which to detach the sealing portion 15 from the spout 12 along the annular portion 19, i.e. the weakening region 14, and so open the opening 16 to pour out the product.

More specifically, the pull ring 21 extends inside, and at a predetermined distance from, the neck portion 18, and is joined to the wall portion 11 by a tab 22.

As shown in FIG. 1, the cap 13 is a screw cap, and has a cylindrical lateral wall 23 with an inner thread 24, which engages a corresponding outer thread 25 on the neck portion 18 of the spout 12.

The method of injection molding the opening device 3 on the packaging material 2 is as follows.

The packaging material 2, in the configuration shown in FIG. 2, is fed along the lengthwise direction A to position a removable portion 8 inside a molding unit 30.

With reference to FIGS. 3 to 6, the molding unit 30 comprises a number of molds, in particular a first mold 30a, a second mold 30b, a third mold 30c, and a fourth mold 30d, which are coaxial with axis B of the opening device 3 being formed, are located on both sides of the packaging material 2, and are movable between an open configuration (not shown) allowing feed of the packaging material 2 in the lengthwise direction A, and a closed configuration (FIGS. 3 to 6), in which they define a closed mold cavity 31 which is filled with molten plastic material.

In the example shown, the first mould 30a defines a first mold arrangement and the second mold 30b, the third mold 30c and the fourth mold 30d define a second mold arrangement located on the opposite side of the packaging material 2 with respect to the first mold arrangement. As shown in FIGS. 3 to 6, the third mold 30c is interposed radially between the second mold 30b and the fourth mold 30d.

The mold cavity 31 comprises a substantially disk-shaped first portion 32 of axis B; a cylindrical tubular second portion 33 extending, coaxially with axis B, from one side of a flat peripheral annular portion 34 of the first portion 32; and a third portion 35 which defines the pull ring 21, and extends from the same side as the second portion 33, and from a radially inner point of the first portion 32 with respect to the peripheral annular portion 34.

The first portion 32 comprises a central portion 36 extending towards the second portion 33 and the third portion 35, and which is connected to the peripheral annular portion 34, and is also connected to a molten plastic material injection conduit 37.

In FIGS. 3 to 6, the first portion 32 is defined by the first mold 30a on one side, and by the second mold 30b, the third mold 30c and the fourth mold 30d on the opposite side. The second portion 33 is defined by the second mold 30b and the third mold 30c. The third portion 35 is defined by the third mold 30c and the fourth mold 30d. The injection conduit 37 extends through the first mold 30a.

As explained in detail below, the first portion 32 defines the wall portion 11 and the flange portion 17 of the spout 12, and the second portion 33 defines the neck portion 18 of spout 12.

Figure 3:
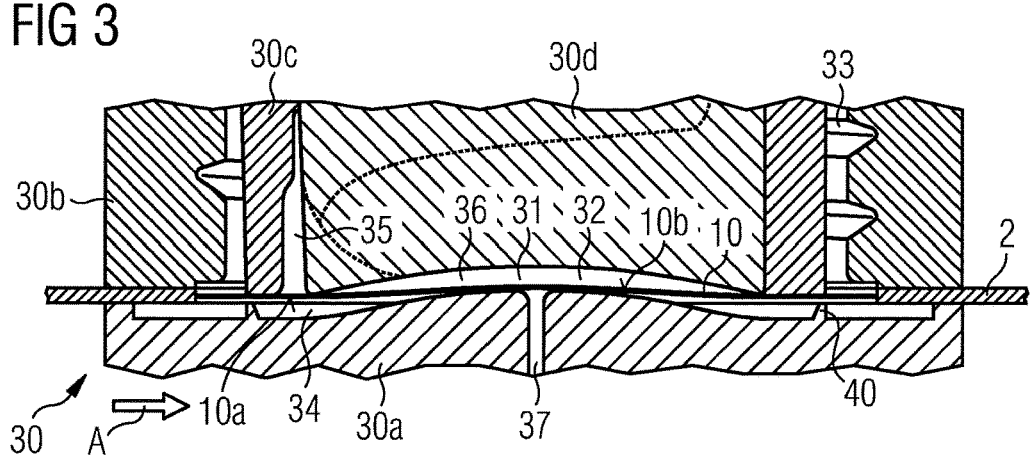
FIGS. 3 to 6 show sections of the sheet packaging material of FIG. 2 during successive steps of the process of molding the opening device.
Figure 4:
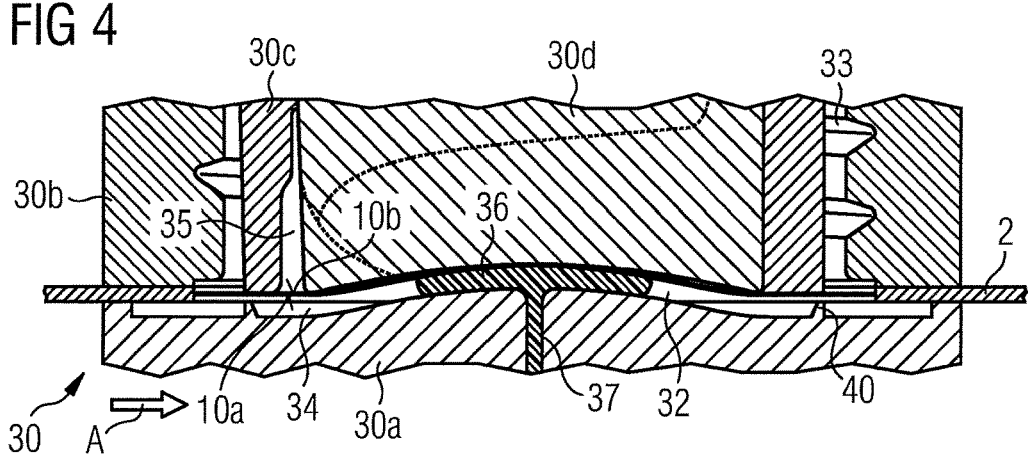
Figure 5:
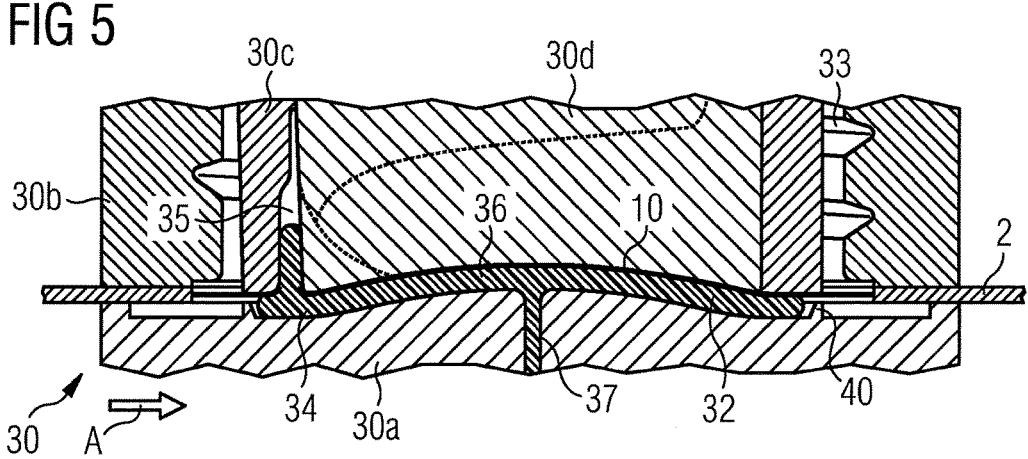
Figure 6:
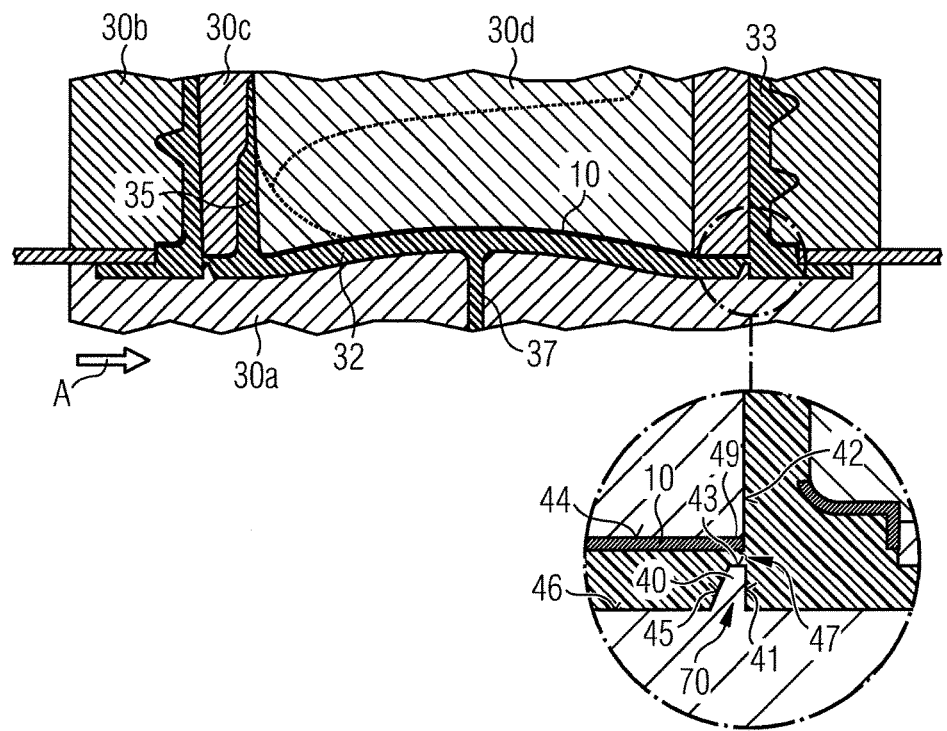

To mold the opening device 3, the packaging material 2 is stopped inside the molding unit 30 in the configuration of FIG. 3, in which the cover portion 10 is housed completely, and totally undamaged, inside the second portion 32 of the mold cavity 31. More specifically, the cover portion 10 is positioned with the side 10b facing the second portion 33 and the third portion 35 of mold cavity 31.

At this point, the molten plastic material is injected along injection conduit 37—from the side 10a of the cover portion 10—into the first portion 32 of the mold cavity 31, which is gradually filled from the central portion 36 towards the annular portion 34.

The pressure of the molten plastic material injected into the first portion 32 of the mold cavity 31 pushes the cover portion 10 against the fourth mold 30d, so that the side 10b of the cover portion 10 contacts the fourth mold 30d.

At this stage, the third covering layer 5b of the cover portion 10 melts completely with the plastic material injected into the mold cavity 31.

The molten plastic material spreads radially inside the first portion 32 until it eventually reaches the intersection of the first portion 32 and the third portion 35, where the cover portion 10, having no solid support by the third mold 30c and the fourth mold 30d, is pierced neatly by the pressure of the molten plastic material, which therefore fills the third portion 35 to form the pull ring 21.

In exactly the same way, when the molten plastic material reaches the annular portion at the intersection of the first portion 32 and the second portion 33, the cover portion 10 is pierced neatly by the pressure of the molten plastic material, which therefore flows into the second portion 33 to form the neck portion 18.

In other words, the molten plastic material pierces through the cover portion 10 at the intersections between the first portion 32 and the second portion 33 and between the first portion 32 and the third portion 35 of the mold cavity 31 to form through openings, which are subsequently sealed by the plastic material to fully restore the integrity of the packaging material 2.

Once the plastic material filling the mold cavity 31 sets, the first mold 30a, the second mold 30b, the third mold 30c and the fourth mold 30d are moved into the open configuration to feed the packaging material 2 once more along lengthwise direction A, extract the removable portion 8, with respective opening device 3 molded thereon, from the molding unit 30, and insert another removable portion 8, on which to perform another molding operation, inside the mould cavity 31.

As shown in FIG. 1 the weakening region 14 is delimited by a first side 51 of the wall portion 11 facing towards the cover portion 10 and by a base portion 52. The base portion 52 is closer to the first side 51 than a second side 53 of the wall portion 11 opposite the first side 51. The base portion 52 is substantially parallel to the first side 51 and to the second side 53.

The opening device 3 comprises a recess 54 extending form the second side 53 and delimited by the base portion 52, by a first wall element 55 and by a second wall element 56.

The first wall element 55 is substantially aligned with an inner wall 57 of the neck portion 18. The first wall element 55 is substantially perpendicular to the base portion 52. The first wall element 55 is also substantially perpendicular to the first side 51 and to the second side 53.

The second wall element 56 extends between the base portion 52 and the second side 53 and delimits a side region of the wall portion 11. The second wall element 56 is inclined with respect to the base portion 52 and the second side 53, the distance of the second wall element 56 from the first wall element 55 increasing when moving from the base portion 52 towards the second side 53.

The cover portion 10 covers the weakening region 14. In particular, an end zone 49 of the cover portion 11 extends over the base portion 52. The cover portion 10 extends up to the inner wall 57.

As shown in FIGS. 3 to 6, the first mould 30a comprises a protrusion 70 extending into the mold cavity 31 and towards the third mold 30c. The protrusion 70 comprises a ridge 40 that has an annular shape around a longitudinal axis of the molding unit 30.

The ridge 40 is arranged at the intersection of the first portion 32 and the second portion 33.

The ridge 40 is delimited by a first wall 41 substantially aligned with a side wall 42 of the third mold 30c, the side wall 42 delimiting the second portion 33.

The ridge 40 is further delimited by a second wall 43 substantially parallel to a bottom wall 44 of the third mold 30c defining the first portion 32. The second wall 43 is substantially perpendicular to the first wall 41.

The side wall 42 is substantially perpendicular to the bottom wall 44.

The ridge 40 is further delimited by a third wall 45 extending from the second wall 43 to a base wall 46 of the first mold 30a, which faces the bottom wall 44 and delimits the first portion 32. The third wall 45 is inclined in such a way that the distance of the third wall 45 from the first wall 41 increases when moving from the second wall 43 towards the base wall 46.

The ridge 40 and the third mold 30c—and more particularly the bottom wall 44 and the second wall 43—delimit a small-section passage 47 for the molten plastic material. The plastic material in the small-section passage 47, once set, forms the weakening region 14. During molding, the plastic material passes through the small-section passage 47 from the first portion 32 to the second portion 33. The end zone 49 of the cover portion 10 is received in the small-section passage 47. In this way, when the plastic material sets, the end zone 49 covers the weakening region 14.

In other words, since the projection 70, i.e. the ridge 40, is provided in the first mould 30a, the cover portion 10 extends onto the weakening region 14, so increasing the gas-barrier property of the opening device 3. In particular, the cover portion 10 extends over the complete length of the bottom wall 44, up to the side wall 42.

Figure 12:
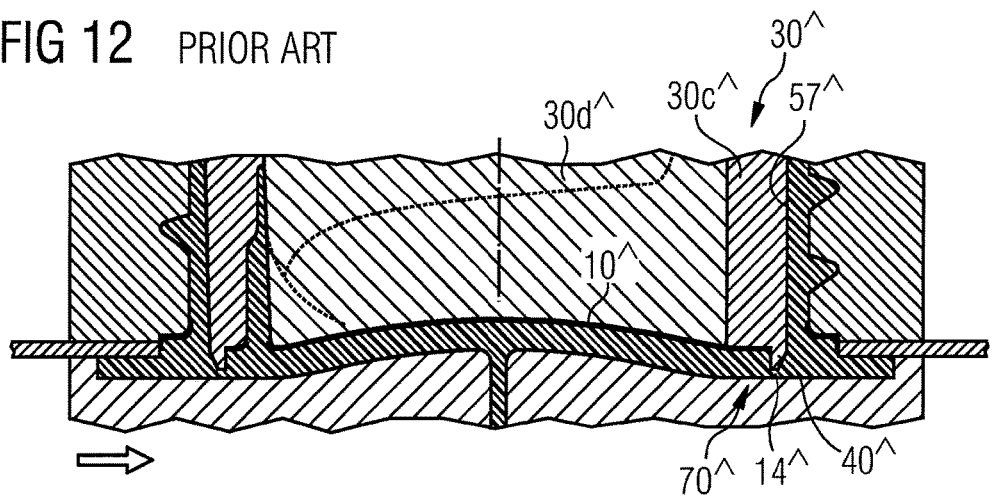
FIG. 12 shows a section of a prior art molding tool during a step of the process of molding an opening device onto a sheet packaging material.

FIG. 12 shows a molding unit 30^ according to the state of the art (the same reference numerals have been used for the same parts and components), in which the protrusion 70^, having the shape of a ridge 40^, extends from the third mold 30c^.

In this case, the weakening region 14^ is not covered by the cover portion 10^. In addition, the cover portion 10^ does not extend up to the inner wall 57^.

According to the invention, the gas barrier properties of the opening device 3 are highly increased since the cover portion 10 also extends over the region in which the plastic material forming the opening device has the minimum thickness, i.e. at the weakening region 14. Where the plastic material is thinner the gas transmission ratio is higher, therefore it is clear that the weakening region 14^ of the known opening device is a critical point, since it is directly exposed and is not protected by the gas barrier layer.

When the opening device 1 is opened for the first time, the weakening region 14 is broken, but the cover portion 10 covering the weakening region 14 is not broken. In this way, no residues of the cover portion 10 project into the opening 16.

Figure 7:
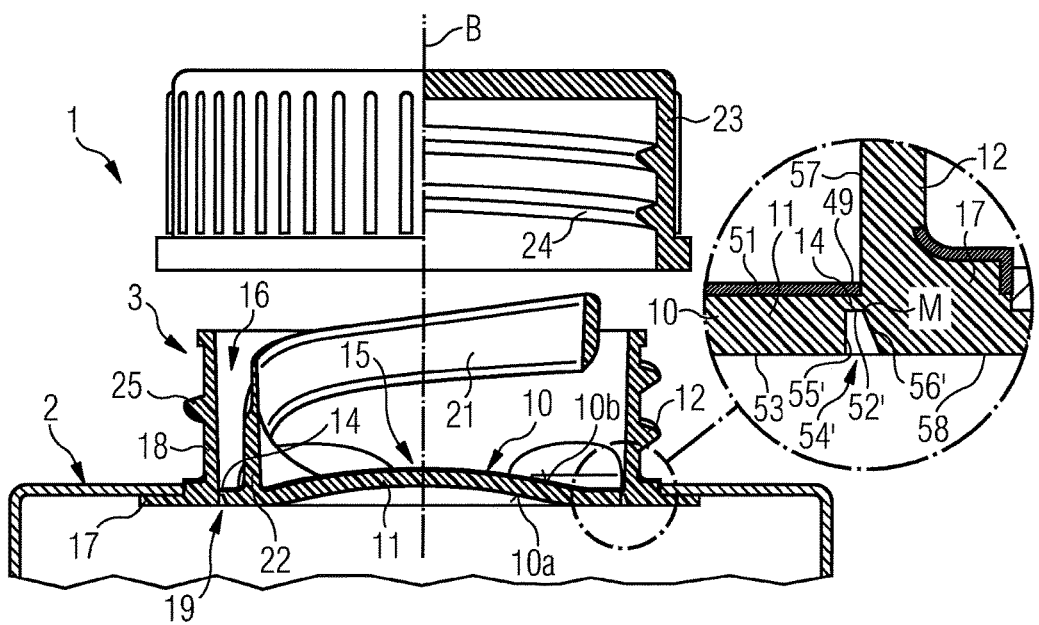
FIG. 7 shows a partly sectioned side view of a sealed package for pourable food products, made of a sheet packaging material on which a second embodiment of the opening device according to the invention is molded.

FIG. 7 shows another embodiment of the opening device 1. The same reference numerals as the ones in FIG. 1 are used to indicate corresponding parts and components.

In the embodiment shown in FIG. 7, the weakening region 14 is delimited by a first side 51 of the wall portion 11 facing towards the cover portion 10 and by a base portion 52'. The base portion 52' is closer to the first side 51 than a second side 53 of the wall portion 11 opposite the first side 51. The base portion 52' is substantially parallel to the first side 51 and to the second side 53.

The opening device 1 comprises a recess 54' extending form the second side 53 and delimited by the base portion 52', by a first wall element 55' and by a second wall element 56'.

The first wall element 55' is substantially parallel to the inner wall 57 of the neck portion 18. The first wall element 55' is closer to the axis B than the inner wall 57. The first wall element 55' is substantially perpendicular to the base portion 52'. The first wall element 55' is also substantially perpendicular to the first side 51 and to the second side 53. The first wall element 55' delimits a side region of the wall portion 11.

The second wall element 56' extends between the base portion 52' and a bottom face 58 of the flange portion 17 and is inclined with respect to the base portion 52' and the bottom face 58, the distance of the second wall element 56' from the first wall element 55' increasing when moving from the base portion 52' towards the bottom face 58.

The point M at which the base portion 52' intersects the second wall element 56' is substantially aligned with the inner wall 57.

The cover portion 10 covers the weakening region 14. In particular, an end zone 49 of the cover portion 11 extends over the base portion 52'. The cover portion 10 extends up to the inner wall 57.

Figure 8:
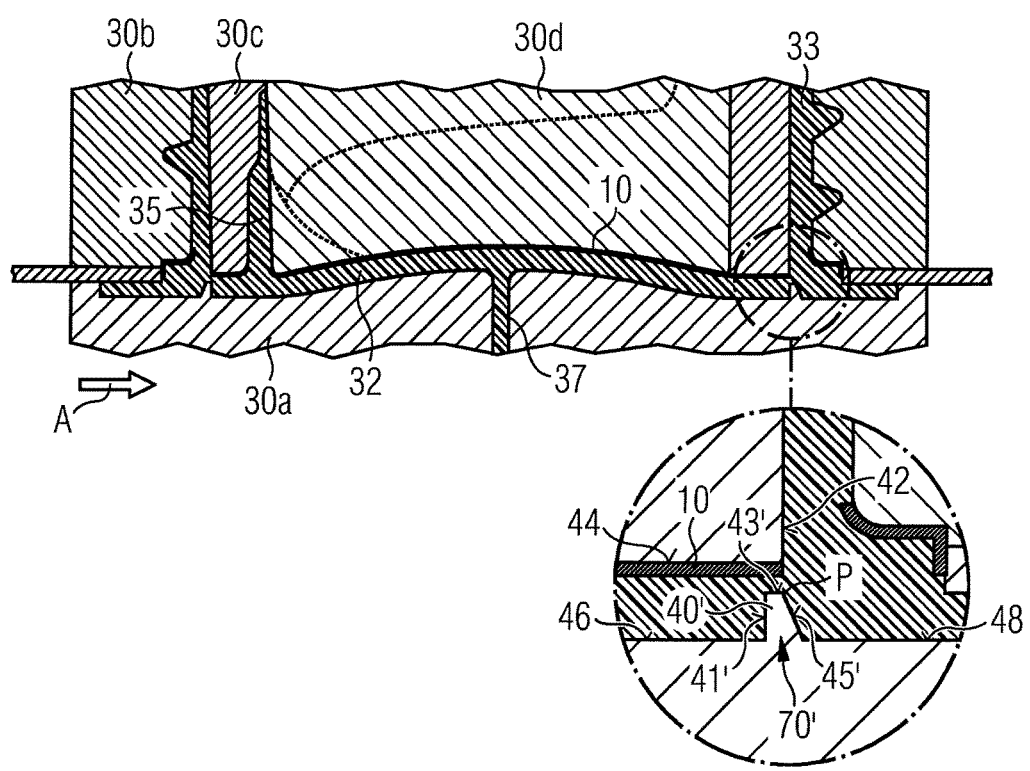
FIG. 8 shows a section of the sheet packaging material of FIG. 7 during a step of the process of molding the opening device.

FIG. 8 shows another embodiment of the molding unit 30. The same reference numerals as the ones in FIGS. 3 to 6 are used to indicate corresponding parts and components.

In the embodiment shown in FIG. 8, the first mould 30*a* comprises a protrusion 70' extending into the mold cavity 31 and towards the third mold 30*c*. The protrusion 70' comprises a ridge 40' that has an annular shape around a longitudinal axis of the molding unit 30.

The ridge 40' is arranged at the intersection of the first portion 32 and the second portion 33.

The ridge 40' is delimited by a first wall 41' substantially parallel to the side wall 42 of the third mold 30*c*, the side wall 42 delimiting the second portion 33. The first wall 41' is closer to the axis B than the side wall 42.

The ridge 40 is further delimited by a second wall 43' substantially parallel to a bottom wall 44 of the third mold 30*c* defining the first portion 32. The second wall 43' is substantially perpendicular to the first wall 41'.

The side wall 42 is substantially perpendicular to the bottom wall 44.

The ridge 40' is further delimited by a third wall 45' extending from the second wall 43 to a further base wall 48 of the first mold 30*a*, which faces the second portion 33. The third wall 45' is inclined in such a way that the distance of the third wall 45' from the first wall 41' increases when moving from the second wall 43' towards the further base wall 48.

The point P at which the second wall 43' intersects the third wall 45' is substantially aligned with the side wall 42.

Figure 9:
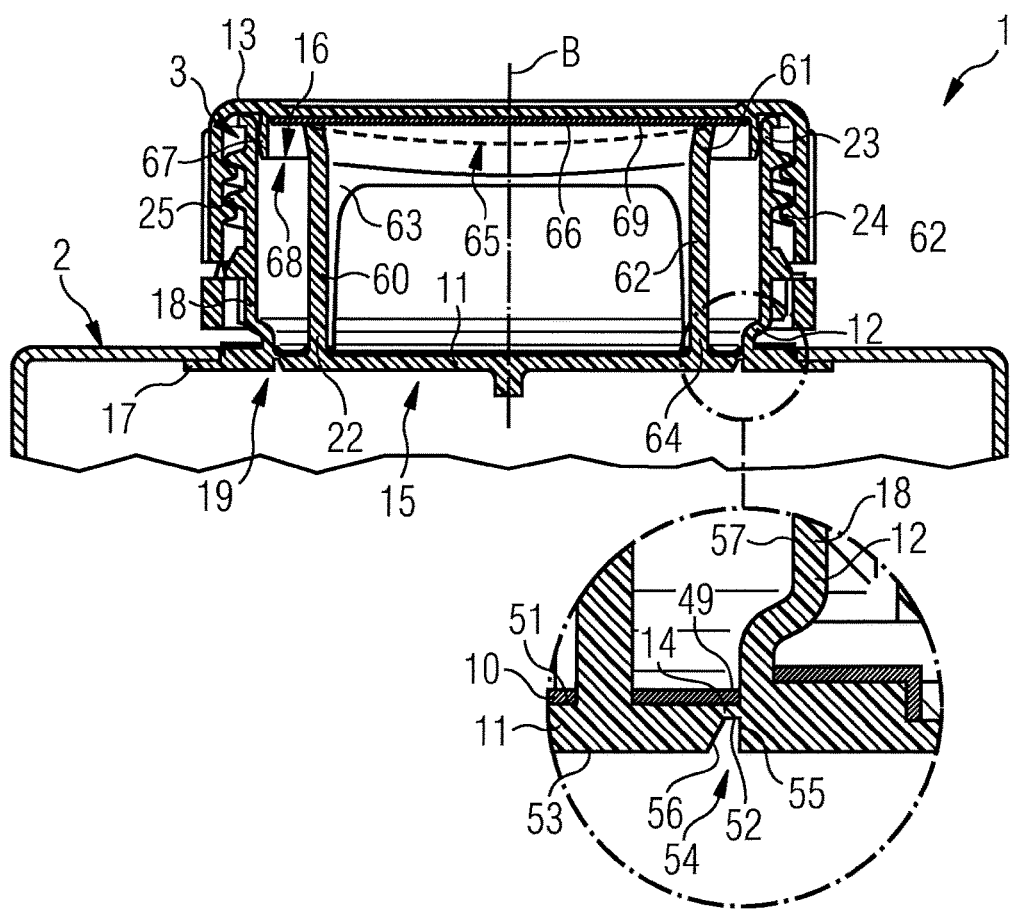
FIG. 9 shows a partly sectioned side view of a sealed package for pourable food products, made of a sheet packaging material on which another opening device according to the invention is molded.

FIG. 9 shows an opening device 3 (the same reference numerals as the ones in FIG. 1 are used to indicate corresponding parts and component) in which the wall portion 11 is formed in one piece with a protruding portion 60 extending through the spout 12 and intended to be permanently connected to the cap 13.

The protruding portion 60 comprises an annular body 61 and two legs 62 integrally connecting the annular body 61 to the wall portion 11. In particular, the legs 62 have first ends 63 integrally connected to respective diametrically opposite portions of the annular the body 61 with respect to axis B, and second ends 64 integrally connected to the wall portion 11.

As a possible alternative not shown, the legs 62 may also be not diametrically opposite to one another.

As a further possible alternative not shown, the protruding portion 60 may comprise more than two legs 62 angularly spaced from each other.

In the embodiment shown, the opening device 3 further comprises a disk-shaped welding promoting element 65 to connect the cap 13 to the protruding portion 60.

The cap 13 comprises a disk-shaped end wall 66 and an annular rib 67 axially protruding from the end wall 66 towards the inside of the cap 13 and defining a seat 68 for receiving the welding promoting element 65.

The welding promoting element 65 is defined by a multilayer sheet element 69 distinct from the cap 13 and permanently connected to the cap 13.

In particular, the sheet element 69 comprises a layer of conductive material, e.g. an aluminum foil, and at least two layers of heat-sealable plastic material, e.g. polyethylene films, covering both sides of the layer of conductive material.

When the cap 13 is applied to the spout 12, a current is generated—by means of an electric induction generating element (not shown), for example a coil—in the welding promoting element 65, in particular in the conductive layer of the sheet element 69. The heat generated by the current causes welding, by induction heating, of the cap 13 and the protruding portion 60. The cap 13 and the sealing portion 15 are, therefore, firmly mutually connected.

When the user removes, i.e. unscrews (in the embodiment shown), the cap 13, the sealing portion 15 is detached from the neck portion 18. The opening device 3 is, in this case, a one-step-opening closure.

In another embodiment, not shown, the protruding portion 60 is directly welded to the cap 13 without interposition of the welding promoting element 65.

In the opening device of FIG. 9 the recess 54, the weakening region 14 and the cover portion 11 are arranged as in the embodiment of FIG. 1.

In the same way, the opening device of FIG. 9 could be provided with a recess 54, a weakening region 14 and a cover portion 11 arranged as in the embodiment of FIG. 7.

Similarly, the opening device of FIG. 9 could be provided with a weakening region 14 and a cover portion 11 arranged as in the embodiment of FIG. 10, which will be disclosed hereinafter.

Figure 10:
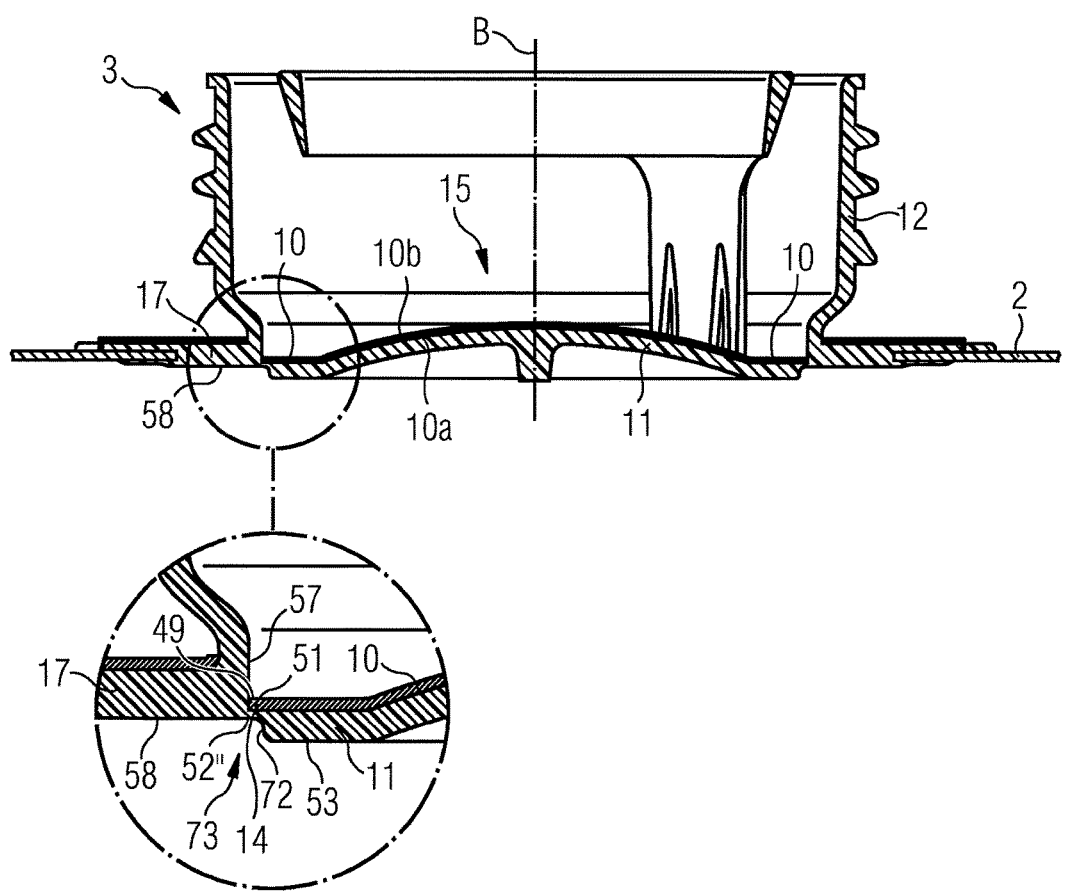
FIG. 10 shows a partly sectioned side view of a sealed package for pourable food products, made of a sheet packaging material on which a third embodiment of the opening device according to the invention is molded.

FIG. 10 shows another embodiment of the opening device 1. The same reference numerals as the ones in FIG. 1 are used to indicate corresponding parts and components.

In the embodiment shown in FIG. 10, the weakening region 14 is delimited by a first side 51 of the wall portion 11 facing towards the cover portion 10 and by a base portion 52". The base portion 52" is closer to the first side 51 than a second side 53 of the wall portion 11 opposite the first side 51. The base portion 52" is substantially parallel to the first side 51 and to the second side 53.

The base portion 52" is aligned with the bottom face 58 of the flange portion 17.

The base portion 52" and the second side 53 are connected by a lateral portion element 72.

The lateral portion element 72 is substantially perpendicular to the base portion 52".

The lateral portion element 72 is also substantially perpendicular to the first side 51 and to the second side 53. The lateral portion element 72 delimits a side region of the wall portion 11.

The lateral portion element 72 is closer to the axis B than the inner wall 57.

In practice, the base portion 52", the second side and the lateral portion element 72 form a step element 73 opposite to the cover portion 10 with respect to the first side 51.

The cover portion 10 covers the weakening region 14. In particular, an end zone 49 of the cover portion 11 extends over the base portion 52". The cover portion 10 extends up to the inner wall 57.

Figure 11:
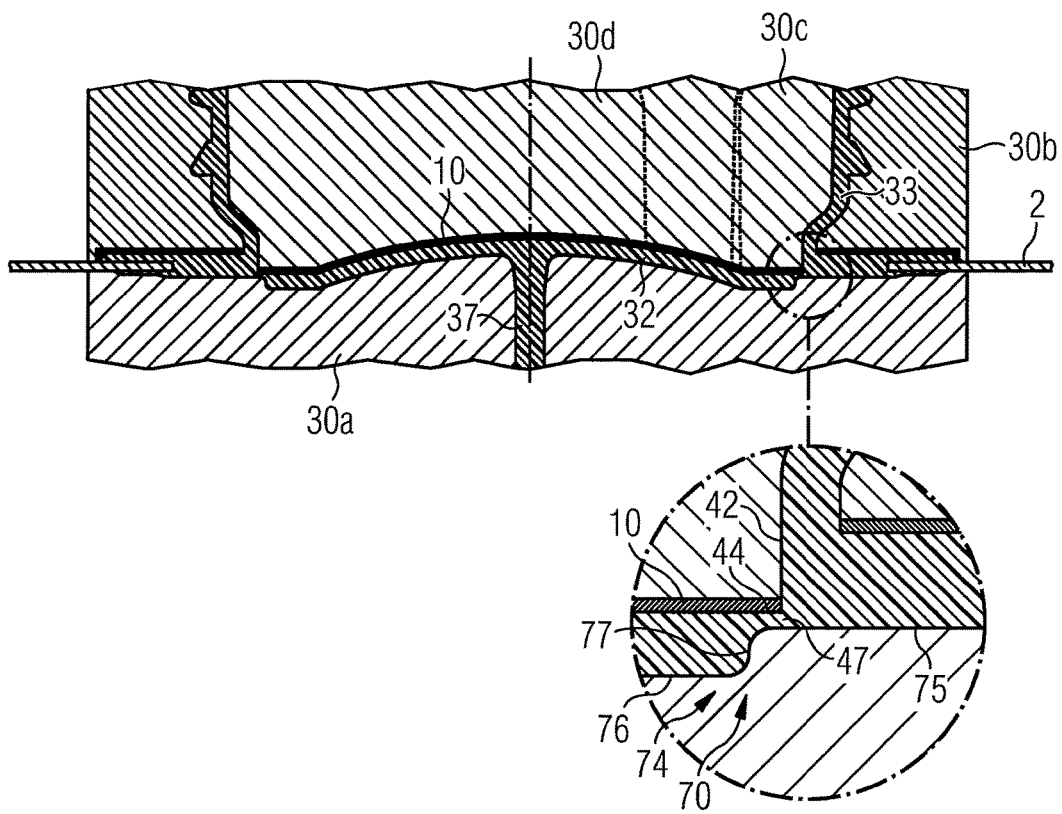
FIG. 11 shows a section of the sheet packaging material of FIG. 10 during a step of the process of molding the opening device.

FIG. 11 shows another embodiment of the molding unit 30. The same reference numerals as the ones in FIGS. 3 to 6 are used to indicate corresponding parts and components.

In the embodiment shown in FIG. 11, the first mould 30a comprises a protrusion 70 extending into the mold cavity 31 and towards the third mold 30c. The protrusion 70 is defined by a step arrangement 74 extending around a longitudinal axis of the molding unit 30.

The step arrangement 74 is arranged at the intersection of the first portion 32 and the second portion 33.

The step arrangement 74 is delimited by a first bottom wall 75 of the first mould 30a, by a second bottom wall 76 of the first mould 30a and by a side wall element 77 interposed between the first bottom wall 75 and the second bottom wall 76.

The first bottom wall 75 is closer to the third mould 30c, in particular to the bottom wall 44, than the second bottom wall 76.

The second bottom wall 76 is closer to the longitudinal axis of the molding unit 30 than the first bottom wall 75.

The side wall element 77 is arranged transversely, in particular is substantially perpendicular, to the first bottom wall 75 and to the second bottom wall 76.

The side wall element 77 is arranged transversely is substantially parallel to the side wall 42 of the third mold 30c, the side wall 42 delimiting the second portion 33.

The side wall 42 is substantially perpendicular to the bottom wall 44.

The side wall element 72 is closer to the longitudinal axis of the molding unit 30 than the side wall 42.

The step arrangement 74 and the third mold 30c—and more particularly the bottom wall 44 and the first bottom wall 75—delimit a small-section passage 47 for the molten plastic material. The plastic material in the small-section passage 47, once set, forms the weakening region 14. During molding, the plastic material passes through the small-section passage 47 from the first portion 32 to the second portion 33. The end zone 49 of the cover portion 10 is received in the small-section passage 47. In this way, when the plastic material sets, the end zone 49 covers the weakening region 14.

In other words, since the projection 70, i.e. the step arrangement 74 is provided in the first mould 30a, the cover portion 10 extends onto the weakening region 14, so increasing the gas-barrier property of the opening device 3. In particular, the cover portion 10 extends over the complete length of the bottom wall 44, up to the side wall 42.

Clearly, changes may be made to the opening device and the molding device as described herein without, however, departing from the scope as defined in the accompanying claims.

In particular, the opening device 3 may be compression molded—instead of injection molded—on the packaging material 2. In this case, the wall portion 11 is compression molded in one piece with the spout 12 onto the packaging material 2.

The invention claimed is:

1. Opening device molded on a sheet packaging material to be formed into a package having an interior, said sheet packaging material comprising at least a first layer and a second layer, and having a hole formed through said first layer and sealed by a cover portion of said second layer, said cover portion possessing first and second sides that are opposite one another, the first side of said cover portion facing towards the interior of the package when the sheet packaging material is formed into the package, said opening device being made of plastic material molded onto said cover portion, and in turn comprising a spout extending through said cover portion so as to project from both a first side of said cover portion and a second side of said cover portion, opposite to said first side and defining a pouring opening and a wall portion closing said pouring opening, the first side of the cover portion directly contacting a first side of the wall portion, the wall portion also possessing a second side opposite the first side, the second side of said wall portion facing towards the interior of the package when the sheet packaging material is formed into the package, said wall portion defining, together with said cover portion, a user-removable sealing portion of said spout, a weakening region being interposed between said wall portion and said spout, the weakening region being constituted by a recess defining a reduced thickness part possessing a thickness that is reduced relative to the thickness of the wall portion, the recess opening to the second side of the wall portion, wherein said cover portion covers said weakening region on the first side of the wall portion, and in that said cover portion extends up to an inner wall of said spout delimiting said pouring opening.

2. Opening device according to claim 1, wherein said weakening region is delimited by the first side of the wall portion and by a base portion, said base portion being closer to said first side of the wall portion than said second side of the wall portion.

3. Opening device according to claim 2, wherein an end zone of said cover portion extends over said base portion.

4. Opening device according to claim 2, wherein the recess is delimited by said base portion, by a first wall element and by a second wall element.

5. Opening device according to claim 4, wherein said first wall element is substantially aligned with an inner wall of said spout and said second wall element extends between said base portion and said second side and delimits a side region of said wall portion, said second wall element being inclined with respect to said base portion and said second side, the distance of said second wall element from said first wall element increasing when moving from said base portion towards said second side.

6. Opening device according to claim 4, wherein said first wall element is substantially parallel to an inner wall of said spout, said first wall element being closer to an axis of said opening device than said inner wall and delimiting a side region of said wall portion, and said second wall element extends between said base portion and a bottom face of an outer flange of said opening device and is inclined with respect to said base portion and said bottom face, the distance of said second wall element from said first wall element increasing when moving from said base portion towards said bottom face and a point at which said base portion intersects said second wall element being substantially aligned with said inner wall.

7. Opening device molded on a sheet packaging material to be formed into a package having an interior, the sheet packaging material comprising at least a first layer and a second layer, and having a hole formed through the first layer and sealed by a cover portion of the second layer, the opening device being made of plastic material molded onto the cover portion, and in turn comprising a spout extending through the cover portion so as to project from both a first side of the cover portion and a second side of the cover portion, opposite to the first side and defining a pouring opening and a wall portion closing the pouring opening, the cover portion possessing first and second sides that are opposite one another, the first side of the cover portion facing towards the interior of the package when the sheet packaging material is formed into the package, the first side of the cover portion directly contacting a first side of the wall portion, the wall portion also possessing a second side opposite the first side, the second side of the wall portion facing towards the interior of the package when the sheet packaging material is formed into the package, the wall portion defining, together with the cover portion, a user-removable sealing portion of the spout, a weakening region constituted by a reduced thickness part possessing a thickness that is reduced relative to the thickness of the wall portion adjacent the weakening region, the reduced thickness part constituting the weakening region being interposed between the wall portion and the spout, the reduced thickness part defining a base portion possessing the thickness that is reduced relative to the thickness of the wall portion adjacent the weakening region, the base portion being located closer to the first side of the wall portion than the second side of the wall portion, the cover portion covering the weakening region on the first side of the wall portion, and the cover portion extending up to an inner wall of the spout delimiting the pouring opening.

8. Opening device according to claim 7, wherein the reduced thickness part is defined by a recess that is delimited by spaced apart first and second wall elements that both intersect and extend from the second side of the wall portion toward the first side of the wall portion.

9. Opening device according to claim 7, wherein the reduced thickness part of the cover portion is defined by a recess delimited by spaced apart first and second wall elements, the cover portion not being in direct contact with the first wall element and the second wall element.

10. Opening device according to claim 7, wherein the reduced thickness part possessing the thickness that is reduced relative to the thickness of the wall portion is located at the first side of the wall portion.

11. Opening device according to claim 7, wherein the weakening region is delimited by the first side of the wall portion and by the base portion that is closer to the first side of the wall portion than the second side of the wall portion.

12. Opening device according to claim 11, wherein an end zone of the cover portion located at a radially outermost periphery of the cover portion extends over the base portion.

13. Opening device according to claim 7, wherein the weakening region is defined by a recess that is delimited by a first wall element, a second wall element and the reduced thickness part.

14. Opening device according to claim 13, wherein the first wall element is substantially aligned with an inner wall of the spout and the second wall element extends between the base portion and the second side of the wall portion and delimits a side region of the wall portion, the second wall element being inclined with respect to the base portion and the second side of the wall portion, a distance between the second wall element and the first wall element increasing from the base portion towards the second side of the wall portion so that the distance between the first and second wall elements adjacent the second side of the wall portion is greater than the distance between the first and second wall elements adjacent the base portion.

15. Opening device according to claim 13, wherein the first wall element is substantially parallel to an inner wall of the spout, the first wall element being closer to an axis of the opening device than the inner wall and delimiting a side region of the wall portion, and the second wall element extending between the base portion and a bottom face of an outer flange of the opening device and being inclined with respect to the base portion and the bottom face, a distance between the second wall element and the first wall element increasing from the base portion towards the bottom face, the base portion intersecting the second wall element at a point substantially aligned with the inner wall.

16. Opening device according to claim 7, wherein a lateral portion element extends between the base portion and the second side of the wall portion, the base portion, the second side of the wall portion and the lateral portion element forming a step element opposite to the cover portion with respect to the first side of the wall portion.

17. Opening device according to claim 16, wherein the base portion is aligned with a bottom face of an outer flange of the opening device, the lateral portion element delimiting a side region of the wall portion and being closer to an axis of the opening device than an inner wall of the spout.

18. Opening device according to claim 16, wherein the spout comprises a cylindrical tubular neck portion projecting axially from an inner lateral edge of a flange portion, the reduced thickness part joining the wall portion and the flange portion to each other, the flange portion possessing a bottom surface, the bottom surface of the flange portion adjacent the inner lateral edge lying in a first plane, an outermost peripheral part of the second side of the wall portion lying in a second plane, the first and second planes being other than coplanar.

19. Opening device according to claim 7, wherein the spout comprises a cylindrical tubular neck portion projecting axially from an inner lateral edge of a flange portion, the reduced thickness part joining the wall portion and the flange portion to each other, the flange portion possessing a bottom surface, the bottom surface of the flange portion adjacent the inner lateral edge lying in a first plane, an outermost peripheral part of the second side of the wall portion lying in a second plane, the first and second planes being other than coplanar.

* * * * *